United States Patent

Groezinger et al.

[11] Patent Number: 4,719,012
[45] Date of Patent: Jan. 12, 1988

[54] TWIST ON DISPOSABLE FILTER

[75] Inventors: John J. Groezinger, Dunlap; Philip E. Moldenhauer, Peoria, both of Ill.

[73] Assignee: Caterpillar Inc., Peoria, Ill.

[21] Appl. No.: 868,482

[22] Filed: May 30, 1986

[51] Int. Cl.⁴ .............................................. B01D 27/08
[52] U.S. Cl. ................................ 210/232; 210/238; 210/443; 210/450; 210/DIG. 17
[58] Field of Search ....... 210/232, 237, 238, DIG. 17, 210/440, 443, 445, 450, 453

[56] References Cited

U.S. PATENT DOCUMENTS

| | | | |
|---|---|---|---|
| 2,905,327 | 9/1959 | Phillips | 210/463 |
| 2,937,756 | 5/1960 | Humbert, Jr. | 210/444 |
| 3,279,609 | 10/1966 | Francois | 210/DIG. 17 |
| 3,358,829 | 12/1967 | Simons | 210/232 |
| 4,052,307 | 10/1977 | Humbert, Jr. | 210/130 |
| 4,105,561 | 8/1978 | Domnick | 210/232 |
| 4,231,872 | 11/1980 | Keil | 210/232 |
| 4,369,113 | 1/1983 | Stifelman | 210/DIG. 17 |
| 4,371,439 | 2/1983 | Thornton | 210/232 |
| 4,617,118 | 10/1986 | Smart | 210/DIG. 17 |

FOREIGN PATENT DOCUMENTS

| | | | |
|---|---|---|---|
| 534703 | 3/1941 | United Kingdom | 210/DIG. 17 |
| 982466 | 2/1965 | United Kingdom | |
| 1297651 | 11/1968 | United Kingdom | |

*Primary Examiner*—Richard V. Fisher
*Assistant Examiner*—Wanda L. Millard
*Attorney, Agent, or Firm*—John W. Grant

[57] ABSTRACT

Spin on disposable filters are useful in removing contaminants from the fluid of fluid systems. Preventing axial elongation of the filter due to fluid pressure therein requires the use of thicker elements, thereby increasing the manufacturing cost. The subject twist or disposable filter includes a twist-lock connector device which captures a portion of a housing between interconnected members of the twist-lock connector device. The twist-lock connector device is adapted for axial sealing engagement with a mounting device and minimizes the area of imbalance, thereby minimizing the forces tending to cause axial elongation of the filter. This permits the use of less expensive materials therein and simplifies the manufacturing procedure.

27 Claims, 4 Drawing Figures

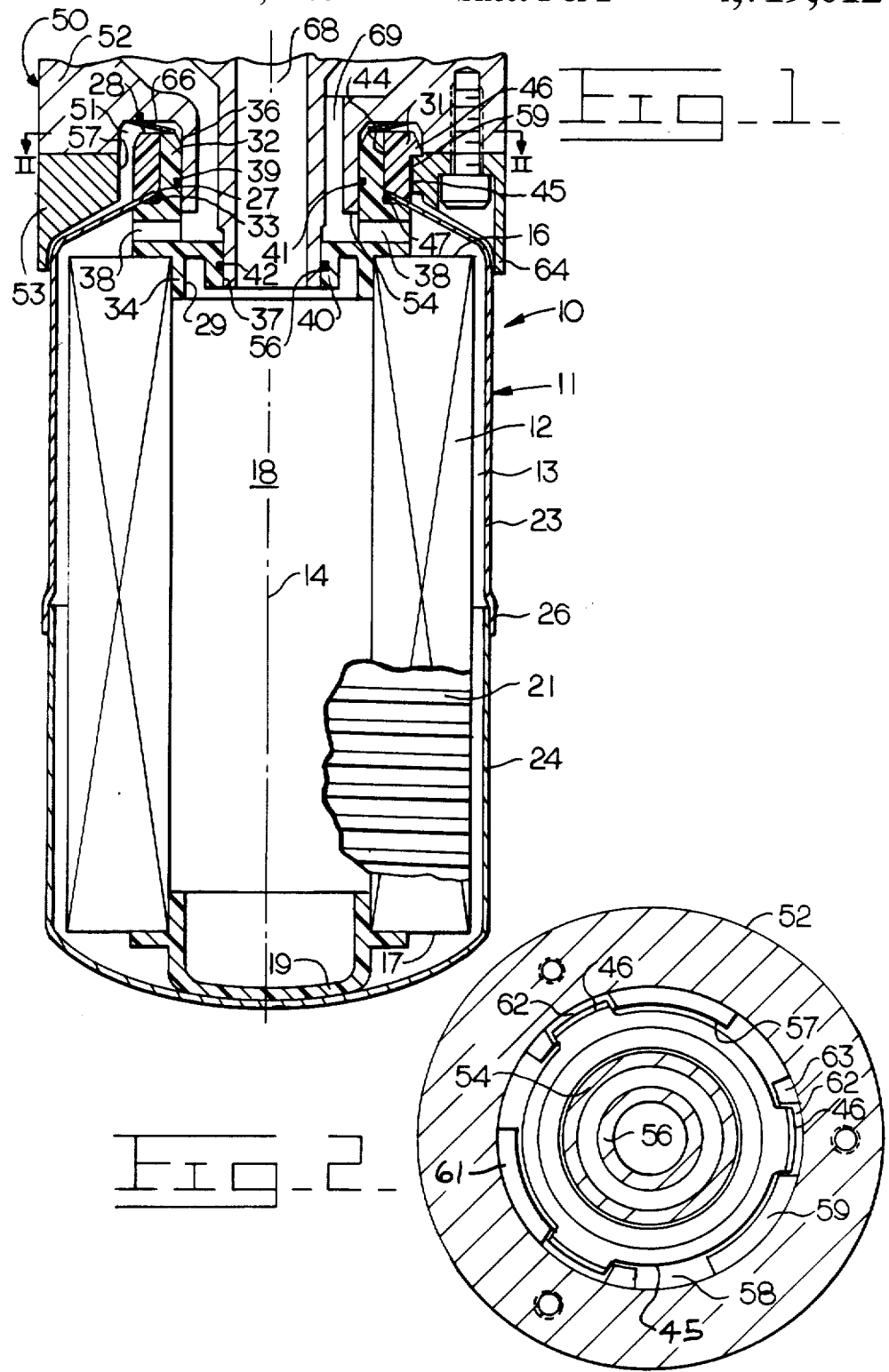

TWIST ON DISPOSABLE FILTER

TECHNICAL FIELD

This invention relates generally to liquid filters, and more particularly, to a twist on disposable or throw away filter which is releasably fastened to a mounting base by simply twisting the filter about one-quarter of a turn.

BACKGROUND ART

Spin on disposable or throwaway filters have been employed in numerous applications including hydraulic systems and engine lubrication systems. Such filters commonly include a thin gauge metal can or housing and a heavy stamped steel cover plate closing one end of the can. A central threaded hole is provided in the cover plate for securing the filter onto a threaded stud of a mounting base. The central opening and a plurality of surrounding openings in the cover direct fluid flow into and out of the filter. An annular seal is suitably connected to the cover radially outside of the plurality of holes and is compressed against a mounting surface of the mounting base to seal between the filter and mounting base when the filter is screwed onto the threaded study.

The outer shell or can of the filter is a pressure vessel which can be subjected to fluid pressure as high as 3450 kPa (500 psi) in some hydraulic systems. Because the seal is disposed radially outside of the plurality of holes, a rather large imbalance of forces is generated within the filter, resulting in large forces being exerted against the bottom of the can. For example, a force of about 1000 kg can be exerted against the bottom of the can of an 8 to 12 cm diameter filter subjected to typical system pressures. This sometimes causes the cover plate to flex sufficiently to unload the seal, permitting fluid to leak past the seal. In extreme cases, the flexure of the cover plate as the hydraulic pressures in the system go up and down causes a fatigue failure in the cover plate.

One solution to this problem is disclosed in U.S. Pat. No. 4,369,113 wherein the top plate is made excessively thick to accommodate the high imbalance of forces. However, making the top plate thicker adds to the cost and requires a special rolled lock seam to lock the cover plate to the can.

Another problem frequently encountered with the spin on fluid filters is that they are usually located in very confined locations, sometimes surrounded by other components such that visual installation of the filter is impossible. This makes the currently available disposable filter very difficult to install and remove. The person installing the filter must get the female threads in the cover plate of the filter exactly aligned with the threads on the threaded stud or the filter will cross thread. Once the threaded connection is initially made, several complete revolutions of the filter are required to bring the seal into contact with the mounting base. Then a very difficult last ¼ to ¾ turn is necessary to compress the seal while it slides along the mating surface of the mounting plate. In many cases, this must be done by wrist action only since a strap wrench can dent the can. Removal is just as difficult as the person tries to maneuver a strap wrench in a confined area. This is aggravated somewhat by the seal tending to adhere to the mounting base over a prolonged period, thereby requiring extra torque to break the seal loose.

The present invention is directed to overcoming one or more of the problems as set forth above.

DISCLOSURE OF THE INVENTION

In one aspect of the present invention, a twist on disposable filter has a cylindrical housing and a cylindrical filter element disposed in the housing defining a chamber therebetween. The filter element has a longitudinally extending axis, opposite end portions, and a longitudinally extending central passage open at one of the end portions and closed at the other end portion. An opening is defined in one end of the housing. A twist-lock connector means extends through the opening in the housing and is sealably connected to the housing adjacent the opening. The connector means has an outer surface, a plurality of circumferentially spaced lugs extending radially outwardly from the outer surface, and a cylindrical bore coaxial with the longitudinal axis of the filter element. The connector means is in engagement with the one end portion of the filter element. Another bore is provided concentric with the bore in the connector element and opens into the central passage of the filter element. A passage means communicates the bore of the connector means with the chamber.

In another aspect of the present invention, the twist on disposable filter and mounting arrangement comprises a mounting means having first and second tubular projections, an annular cavity, a bore opening into the cavity, and a plurality of circumferentially spaced slots formed in the bore separated by a plurality of radially inwardly projecting tabs. A twist on disposable filter includes a housing having an opening in one end thereof. A cylindrical filter element is disposed in the housing defining a chamber therebetween. The filter element has a central passage therein having an opening at one end of the filter and being closed at the other end. A twist-lock connector means extends through the opening in the housing and is in engagement with the filter element and sealably connected to the housing adjacent the opening. The connector means has a bore and a plurality of circumferentially spaced radially outwardly extending lugs. Another bore is provided concentric with the first bore in the connector means. A passage communicates the bore in the connector means with the chamber. The connector means extends into the annular cavity with the bore in the connector means slidably engaging the first tubular projection, the other bore slidably engaging the second tubular projection, and the lugs being in releaseable locking engagement with the tabs.

The present invention provides a twist on disposable filter which can be installed on and removed from a mounting base by a simple pushing motion and ¼ twist of the filter. The concentric bores of the twist-lock connector means are adapted to mate with tubular members on the mounting base so that the filter is self-aligning and self-piloting to simplify installation in blind and confined areas. Moreover, the unbalanced forces of the present filter are kept much smaller so the "blow off" forces are drastically reduced to about 100 kg. This also permits the use of less expensive and lighter weight materials in the twist-lock connector device of the filter.

BRIEF DESCRIPTION OF THE DRAWINGS

FIG. 1 is a sectional view of an embodiment of the present invention;

FIG. 2 is a sectional view taken along line II—II of FIG. 1;

BEST MODE FOR CARRYING OUT THE INVENTION

Figure 4:
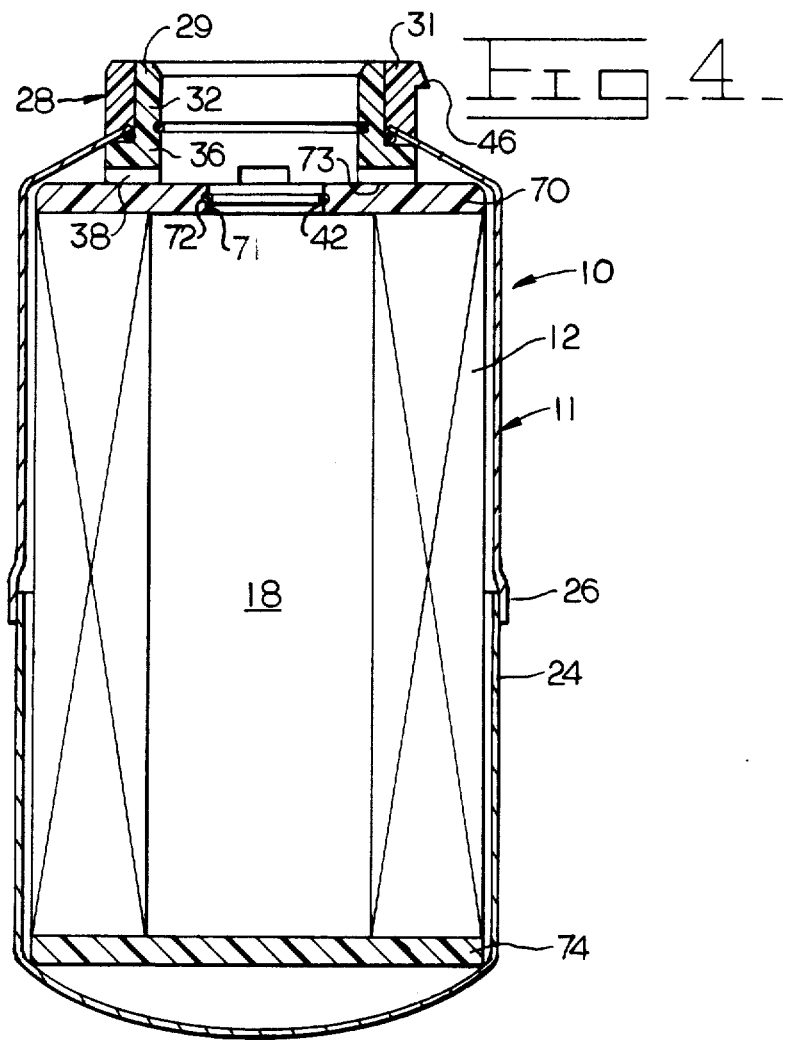
FIG. 4 is a sectional view of another embodiment of the present invention.

Referring to the drawings, a twist on throwaway or disposable filter 10 includes a cylindrical housing 11 and a cylindrical filter element 12 disposed therein defining an annular chamber 13 therebetween. The filter element 12 has a longitudinal axis 14, opposite end portions 16,17, a longitudinally extending central passage 18 open at the end portion 16, and a plug 19 which closes the central passage at the end portion 17. The plug 19 extends into the central passage 18 at the end portion 17 and is sealably connected to the filter element. The plug 19 is in abutment with the end of the housing 11.

The filter element 12 in this embodiment is a pleated paper filter encircled by a spiral wrap of fiberglass roving 21 coated with hot melt glue. The inside edges of the pleats are adhesively jointed together at the end portions 16,17 to isolate the inside surface of the pleated paper from the outside surface.

The cylindrical housing 11 includes two separate deep drawn cylindrical elements 23,24 sealably connected together at an overlap joint 26. The overlap joint 26 in this embodiment is joined by laser welding; however, other suitable processes can be employed for joining the two elements together. An opening 27 is defined in one end of the cylindrical housing 11.

A twist-lock connector means 28 extends through the opening 27 in the housing 11 and is sealably connected to the housing adjacent the opening. The connector means 28 includes first and second members 29,31. The first member 29 has a cylindrical portion 32 extending through the opening 27, a generally radially outwardly extending shoulder 33 in abutment with an inner surface of the housing 11 and a cylindrical extension 34 extending into the open end of the central passage 18 of the filter element 12. The cylindrical extension 34 engages and is sealably connected to the filter element at the end portion 16 thereof. A bore 36 is provided in the cylindrical portion 32 coaxial with the longitudinal axis 14 of the filter element. Another bore 37 is provided in the cylindrical extension 34 and is concentric with the bore 36. The bore 37 opens into the central passage 18 of the filter element. A plurality of radially extending passages 38 communciate the bore 36 with the annular chamber 13. Annular grooves 39,40 are provided in the bore 36,37, respectively. O-ring seals 41,42 are seated in the annular grooves 39,40.

The second member 31 of the connector means 38 has a cylindrical bore 44, an outer surface 45, and a plurality of circumferentially spaced lugs 46 extending radially outwardly from the outer surface 45. The cyindrical portion 32 of the first member 29 extends into the bore 44 of the second member and is bonded thereto by chemical bonding, adhesive bonding, laser welding, etc. An O-ring seal 47 is disposed between the first member 29 and the housing 11 to sealably isolate the annular chamber 13 from the exterior of the filter. Both the first and second members 29,31 of this embodiment are made of platic. However, they can be made of any suitable metal.

The twist on disposable filter 10 is adapted to be removably connected to a mounting means 50 by axially inserting the connector means 28 into a cavity 51 of the mounting means 50 and twisting the filter about its longitudinal axis. The mounting means 50 of this embodiment includes a base 52 and an annular detent plate 53 connected to the base 52 to define the cavity 51. The base 52 has first and second tubular projections 54,56 slidably extending into the bores 36,37, respectively, and sealably engage the seals 41,42.

Figure 3:
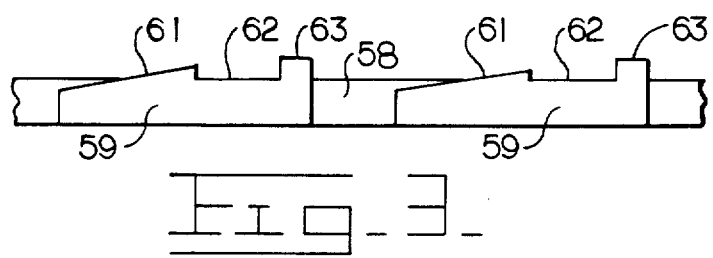
FIG. 3 is a somewhat schematic developmental view of a portion of the embodiment of the present invention.

The detent plate 53 has a bore 57 opening into the cavity 51. The inner marginal edge of the bore has a plurality of circumferentially spaced slots 58 corresponding in number, spacing, and size to the lugs 46 of the connector means 28 wherein the lugs 46 can pass therethrough. The slots are separated by a plurality of tabs 59. As more clearly shown by the development view of FIG. 3, the inner surface of the tabs 59 between adjacent slots define a ramp surface 61, a lug receiving pocket 62, and a positive stop 63. The detent plate also includes a cylindrical skirt 64 shaped to closely match the end of the filter housing 11. An annular conical spring 66 is positioned in the cavity in engagement with the connector means 28. Alternatively, the conical spring 66 can be replaced with a wave washer spring.

With the disposable filter 10 connected to the mounting means 50, as shown, fluid communication is established between a central passage 68 in the second tubular projection 56, and the central passage 18 of the filter element 12 and between a passage 69 in the first tubular projection 54 and the passages 38 communicating the bore 36 with the chamber 13.

An alternate embodiment of a twist on disposable filter 10 of the present invention is disclosed in FIG. 4. It is noted that the same reference numerals of the first embodiment are used to designate similarly constructed counterpart elements of this embodiment. In this embodiment, however, the filter element 12 is provided with an end cap 70 integrally bonded thereto. A bore 71 is provided in the end cap and a seal 42 is suitably seated in an annular groove 72 therein. A lower end 73 of the first member 29 is in abutting engagement with the end cap 70. Another end cap 74 is integrally bonded to the other end of the filter element 12 and closes the central passage 18 at that end of the filter element.

INDUSTRIAL APPLICABILITY

In the operation of the present invention, the twist on disposable filter 10 is removed from the mounting means 50 by applying an axial force to the end of the housing 11 to overcome the bias of the spring 66, thereby displacing the lugs 46 from the pocket 62. The filter 10 is then twisted counterclockwise until the lugs 46 become aligned with the slots 58 and then moved axially away from the base 52.

To install the filter 10 on the mounting means 50, the above steps are reversed. The tubular projection 56 is the first contact point between the mounting means and the disposable filter and thereafter functions as a pilot to permit easy insertion of the twist-lock connector means 50 into the central cavity 51 of the mounting means 50. A simple pushing motion compresses the spring 66 when the end of the connector means comes into contact therewith. The filter 10 is in twisted clockwise causing the lugs 46 to slide along the ramp surface 61 until the lugs drop into the pockets 62 to lock the filter to the mounting base.

In one embodiment, the disposable filter 10 is an inside-out filter wherein the fluid to be filtered enters the central passage 18 through the passage 68 in the tubular projection 56, passes through the filter element 12 into the annular chamber 13, and exits the filter through the radial passages 38 in the connector means 28 and the passages 69 in the mounting means 50. However, the fluid flow can be reversed by using a filter element 12 specifically designed for outside-in fluid flow without departing from the scope of the present invention.

In view of the foregoing, it is readily apparent that the structure of the present invention provides an improved twist on disposable filter which can be installed and removed without the aid of special tools. During installation, the bore initially engages the tubular projection which thereafter acts as a pilot for the subsequent installation steps. The seals are radially compressed by the tubular projections and assure a positive seal with each new filter installed. Moreover, the connector means keeps the imbalanced area rather small so that the unbalanced forces are rather small. Finally, the lugs of the twist-lock connector means are located outside of the area of pressure imbalance, thereby permitting the use of lightweight and less expensive material therein.

Other aspects, objects and advantages of this invention can be obtained from a study of the drawings, the disclosure and the appended claims.

We claim:

1. A twist on disposable filter having a generally cylindrical housing and a filter element disposed in the housing defining a chamber therebetween, said filter element having a longitudinally extending axis, opposite end portions and a longitudinally extending central passage open at one of the end portions and being closed at the other end portion comprising:

means defining an opening in one end of the housing;
   twist-lock connector means extending through the opening in the housing and being sealably connected to the housing adjacent the opening, said connector means having an outer surface, a plurality of circumferentially spaced lugs extending radially outwardly from the outer surface, and a cylindrical bore coaxial with the longitudinal axis of the filter element, said connector means engaging the one end portion of the filter element;
   means defining another bore concentric with the bore in the connector means and opening into the central passage of the filter element; and
   passage means communicating the bore in the connector means with the chamber.

2. The twist on disposable filter of claim 1 wherein said twist-lock connector means has a cylindrical extension extending into the open end of the central passage, said another bore being provided in the cylindrical extension.

3. The twist on disposable filter of claim 2 wherein said twist-lock connector means has a first groove in the bore and a second groove in said another bore and including first and second seals seated in the first and second grooves respectively.

4. The twist on disposable filter of claim 2 wherein said cylindrical extension of the twist-lock connector means sealingly engages the filter element.

5. The twist on disposable filter of claim 1 wherein said passage means is a plurality of radially extending passages in the connector means.

6. The twist on disposable filter of claim 1 wherein said twist-lock connector means includes first and second members, said first member having a cylindrical portion and an outwardly extending annular shoulder, said cylindrical portion extending through the opening in the housing with the shoulder being in abutment with the inside of the housing, said second member being secured to the cylindrical portion and being in abutment with the outside of the housing.

7. The twist on disposable filter of claim 6 wherein the second member is secured to the cylindrical portion with a chemical bond.

8. The twist on disposable filter of claim 6 wherein said lugs are formed as integral parts of the second member.

9. The twist on disposable filter of claim 6 wherein said first and second members are made of a plastic material.

10. The twist on disposable filter of claim 6 including a seal disposed between the annular shoulder and the housing.

11. The twist on disposable filter of claim 1 wherein said twist-lock connector means includes first and second members, said first member having a portion disposed inside the housing and in abutment therewith adjacent the opening, said second member being in abutment with the outside of the housing adjacent the opening, said second member being secured to the first member.

12. The twist on disposable filter of claim 1 including a plug located at the other end portion of the filter element and secured thereto closing the central passage at the other end portion, said housing being in abutment with the plug.

13. The twist on disposable filter of claim 1 wherein said housing includes first and second elements connected together at an overlap joint.

14. The twist on disposable filter of claim 13 wherein the first and second elements are laser welded together at said overlap joint.

15. The twist on filter of claim 1 wherein said filter element includes an end cap, said another bore being provided in the end cap.

16. The twist on filter of claim 15 wherein the twist-lock connector means has a first groove in the bore and the end cap has a second groove in said another bore and including first and second seals seated in the first and second grooves, respectively.

17. A twist on disposable filter and mounting arrangement, comprising:

mounting means having
   (a) first and second concentrically disposed tubular projections,
   (b) an annular cavity,
   (c) a bore opening into the annular cavity,
   (d) a plurality of circumferentially spaced slots formed in the bore defining a plurality of radially inwardly projecting tabs; and
   a twist on disposable filter including
   (a) a housing having an opening in one end thereof,
   (b) a filter element disposed in the housing defining an annular chamber therebetween and having a central passage therein open at one end and closed at the other end,
   (c) twist-lock connector means extending through the opening in the housing and being in engagement with the filter element and sealably connected to the housing adjacent the opening, said connector means having a bore and a plurality of circumferentially spaced radially outwardly extending lugs,
(d) means defining another bore concentric with the bore in the connector means, and
(e) a passage communicating the bore in the connector means with the chamber, and
said connector means extending into the annular cavity with the bore in the connector means slidably engaging the first tubular projection, the other bore slidably engaging the second tubular projection and the lugs being in releaseable locking engagement with the tabs.

18. The twist on disposable filter of claim 17 wherein said twist-lock connector means has a cylindrical extension extending into the open end of the central passage, said another bore being provided in the cylindrical extension.

19. The twist on disposable filter of claim 18 wherein said twist-lock connector means has a first groove in the bore and a second groove in said another bore and including first and second seals seated in the first and second grooves, respectively.

20. The twist on disposable filter of claim 17 wherein said passage means is a plurality of radially extending passages in the connector means.

21. The twist on disposable filter of claim 17 wherein said twist-lock connector means includes first and second members, said first member having a cylindrical portion and an outwardly extending annular shoulder, said cylindrical portion extending through the opening in the housing with the shoulder being in abutment with the inside of the housing, said second member being secured to the cylindrical portion and being in abutment with the outside of the housing.

22. The twist on disposable filter of claim 21 wherein the second member is secured to the cylindrical portion with a chemical bond.

23. The twist on disposable filter of claim wherein said lugs are formed as integral parts of the second member.

24. The twist on disposable filter of claim wherein said first and second members are made of a plastic material.

25. The twist on disposable filter of claim including a seal disposed between the annular shoulder and the housing.

26. The twist on disposable filter of claim wherein said housing includes first and second elements connected together at an overlap joint.

27. The twist on disposable filter of claim 26 wherein the first and second elements are laser welded together at said overlap joint.

* * * * *

UNITED STATES PATENT AND TRADEMARK OFFICE
CERTIFICATE OF CORRECTION

PATENT NO. : 4,719,012
DATED      : January 12, 1988
INVENTOR(S) : John J. Groezinger et al.

It is certified that error appears in the above-identified patent and that said Letters Patent is hereby corrected as shown below:

Column 8   line 11,  --21-- inserted after "claim"

Column 8   line 14,  --21-- inserted after "claim"

Column 8   line 17,  --21-- inserted after "claim"

Column 8   line 20,  --17-- inserted after "claim"

Signed and Sealed this

Twenty-eighth Day of June, 1988

Attest:

DONALD J. QUIGG

Attesting Officer

Commissioner of Patents and Trademarks